US012085247B2

(12) United States Patent
Lee

(10) Patent No.: US 12,085,247 B2
(45) Date of Patent: *Sep. 10, 2024

(54) LAMP FOR VEHICLE AND VEHICLE INCLUDING THE SAME

(71) Applicant: HYUNDAI MOBIS CO., LTD., Seoul (KR)

(72) Inventor: Hyun Soo Lee, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,262

(22) Filed: Mar. 24, 2023

(65) Prior Publication Data

US 2023/0228395 A1 Jul. 20, 2023

Related U.S. Application Data

(63) Continuation of application No. 17/562,158, filed on Dec. 27, 2021, now Pat. No. 11,619,362.

(30) Foreign Application Priority Data

Sep. 13, 2021 (KR) ........................ 10-2021-0121613

(51) Int. Cl.
*F21S 41/24* (2018.01)
*F21S 41/27* (2018.01)

(52) U.S. Cl.
CPC ............... *F21S 41/24* (2018.01); *F21S 41/27* (2018.01)

(58) Field of Classification Search
CPC .................................. F21S 41/24; F21S 41/27
See application file for complete search history.

(56) References Cited

U.S. PATENT DOCUMENTS 7,261,449 B2 8/2007 Albou
10,663,131 B1 * 5/2020 Zhu ........................ F21S 41/143
10,900,629 B2 * 1/2021 Kogure ................. F21S 41/147
11,041,600 B2 * 6/2021 Sato ....................... F21S 43/241
(Continued)

FOREIGN PATENT DOCUMENTS

DE 102006030584 A1 1/2008
DE 202006019347 U1 5/2008
(Continued)

OTHER PUBLICATIONS

Office Action issued Apr. 18, 2023 in the corresponding Korean Patent Application No. 10-2021-0121613.
(Continued)

*Primary Examiner* — Matthew J. Peerce
(74) *Attorney, Agent, or Firm* — Novo TechIP International PLLC

(57) ABSTRACT

Disclosed is a lamp for a vehicle, the lamp including: a light source; a collimator positioned in front of the light source; and a light guide part, in which the light guide part includes: a light entering portion; a light exiting portion; and a body portion configured to connect the light entering portion and the light exiting portion, in which an optical axis AXI of the light entering portion and an optical axis AXO of the light exiting portion are parallel to each other, and in which the optical axis AXI of the light entering portion is spaced apart upward from the optical axis AXO of the light exiting portion.

18 Claims, 6 Drawing Sheets

(56) References Cited

U.S. PATENT DOCUMENTS

| | | | |
|---|---|---|---|
| 11,371,669 | B2 | 6/2022 | Kemetmuller et al. |
| 2010/0309679 | A1 | 12/2010 | Yamagata et al. |

FOREIGN PATENT DOCUMENTS

| | | | |
|---|---|---|---|
| DE | 102017122502 | A1 | 3/2019 |
| EP | 1715245 | A1 | 10/2006 |
| FR | 3010772 | A1 | 3/2015 |
| JP | 2018-136433 | A | 8/2018 |
| KR | 10-2018-0111027 | A | 10/2018 |

OTHER PUBLICATIONS

Office Action issued Jun. 8, 2022 in the corresponding German Patent Application No. 102021134644.4.

* cited by examiner

LAMP FOR VEHICLE AND VEHICLE INCLUDING THE SAME

CROSS-REFERENCE TO RELATED APPLICATIONS

This application is a continuation application from U.S. patent application Ser. No. 17/562,158 filed on Dec. 27, 2021 and titled "LAMP FOR VEHICLE AND VEHICLE INCLUDING THE SAME," which claims priority to and the benefit of Korean Patent Application No. 10-2021-0121613 filed in the Korean Intellectual Property Office on Sep. 13, 2021, the entire contents of which are incorporated herein by reference.

BACKGROUND OF THE INVENTION

1. Field of the Invention

The present disclosure relates to a lamp for a vehicle and a vehicle including the same.

2. Discussion of Related Art

Various types of vehicle lamps, which are classified depending on functions thereof, are mounted in a vehicle. For example, low beam lamps, high beam lamps, daytime running light (DRL) lamps, and the like are mounted on a front side of the vehicle. Among the vehicle lamps, the low beam lamp forms a light distribution pattern having a cut-off line shape formed at an upper side thereof.

Meanwhile, the low beam lamp in the related art includes a shield configured to form a cut-off line by blocking some of light beams emitted from a light source, and an inner lens configured to totally reflect the light beams and allow the light beams to propagate forward. However, the shield and the inner lens are separately provided, which complicates a configuration of the low beam lamp and increases a volume thereof.

In addition, according to the present disclosure, some of the light beams emitted from the light source are blocked by the shield, which significantly degrades luminous efficiency of the low beam lamp.

BRIEF SUMMARY OF THE INVENTION

The present disclosure has been made in an effort to manufacture a low beam lamp having a structure with a simplified configuration and improved luminous efficiency.

A first aspect of the present disclosure provides a lamp for a vehicle, the lamp including: a light source configured to emit light; a collimator disposed in front of the light source and configured to allow the light exiting the light source to enter the collimator; and a light guide part disposed in front of the collimator and configured to allow the light exiting the collimator to enter the light guide part, in which the light guide part includes: a light entering portion provided at a rear side of the light guide part, disposed to face the collimator, and configured to allow the light exiting the collimator to enter the light entering portion; a light exiting portion provided at a front side of the light guide part and configured to allow the light exiting the light entering portion to enter the light exiting portion; and a body portion configured to connect the light entering portion and the light exiting portion, in which the light entering portion, the light exiting portion, and the body portion are integrated, in which an optical axis AXI of the light entering portion and an optical axis AXO of the light exiting portion are parallel to each other, and in which the optical axis AXI of the light entering portion is spaced apart upward from the optical axis AXO of the light exiting portion.

The optical axis AXI of the light entering portion may be spaced apart upward from the optical axis AXO of the light exiting portion in a vertical direction.

The body portion may include a recessed region formed in a lower surface of the light guide part and having a shape recessed upward.

The recessed region may include a first section extending to be inclined upward and forward, and a reflective layer for reflecting light may be formed on a surface of the first section.

The recessed region may further include a second section extending forward from the first section and having a predetermined angle with respect to a direction in which the first section extends.

The recessed region may further include a third section extending downward from the second section.

An optical axis AXL of the light source, an optical axis AXC of the collimator, and the optical axis AXO of the light exiting portion may correspond to one another.

The optical axis AXL of the light source and the optical axis AXO of the light exiting portion may be parallel to each other, and the optical axis AXL of the light source may be spaced apart upward from the optical axis AXO of the light exiting portion.

The optical axis AXC of the collimator and the optical axis AXO of the light exiting portion may be parallel to each other, and the optical axis AXC of the collimator may be spaced apart upward from the optical axis AXO of the light exiting portion.

The optical axis AXL of the light source, the optical axis AXC of the collimator, and the optical axis AXI of the light entering portion may correspond to one another.

The optical axis AXO of the light exiting portion may be formed on a surface of the second section.

The second section may include a cut-off portion having a stepped shape, and the cut-off portion may include: an upper surface provided at one side in a leftward/rightward direction; a lower surface provided at the other side in the leftward/rightward direction and disposed below the upper surface; and an inclined surface configured to connect the upper surface and the lower surface and extending inclinedly.

A height of the light entering portion in an upward/downward direction may be greater than a height of the light exiting portion in the upward/downward direction.

A width of the light entering portion in a leftward/rightward direction may be greater than a width of the light exiting portion in the leftward/rightward direction.

A second aspect of the present disclosure provides a lamp for a vehicle, the lamp including: a light source configured to emit light; a collimator disposed in front of the light source and configured to allow the light exiting the light source to enter the collimator; and a light guide part disposed in front of the collimator and configured to allow the light exiting the collimator to enter the light guide part, in which the light guide part includes: a light entering portion disposed at a rear side of the light guide part, disposed to face the collimator, and configured to allow the light exiting the collimator to enter the light entering portion; a light exiting portion provided at a front side of the light guide part and configured to allow the light exiting the light entering portion to enter the light exiting portion; and a body portion configured to connect the light entering portion and the light exiting portion, in which the light entering portion, the light exiting portion, and the body portion are integrated, and in which an optical axis AXC of the collimator extends to be inclined upward and forward in comparison with an optical axis AXO of the light exiting portion.

An angle θ defined between the optical axis AXC of the collimator and the optical axis AXO of the light exiting portion may be equal to or smaller than an angle α defined between the optical axis AXO of the light exiting portion and a line L connecting a focal point F of the light exiting portion and an upper end of the light exiting portion.

An optical axis AXI of the light entering portion may extend to be inclined upward and forward.

The optical axis AXC of the collimator and the optical axis AXI of the light entering portion may be parallel to each other or correspond to each other.

A third aspect of the present disclosure provides a vehicle including a lamp for a vehicle, in which the lamp includes: a light source configured to emit light; a collimator disposed in front of the light source and configured to allow the light exiting the light source to enter the collimator; and a light guide part disposed in front of the collimator and configured to allow the light exiting the collimator to enter the light guide part, in which the light guide part includes: a light entering portion provided at a rear side of the light guide part, disposed to face the collimator, and configured to allow the light exiting the collimator to enter the light entering portion; a light exiting portion provided at a front side of the light guide part and configured to allow the light exiting the light entering portion to enter the light exiting portion; and a body portion configured to connect the light entering portion and the light exiting portion, in which the light entering portion, the light exiting portion, and the body portion are integrated, in which an optical axis AXI of the light entering portion and an optical axis AXO of the light exiting portion are parallel to each other, and in which the optical axis AXI of the light entering portion is spaced apart upward from the optical axis AXO of the light exiting portion.

According to the present disclosure, it is possible to manufacture a low beam lamp having a structure with a simplified configuration and improved luminous efficiency.

DETAILED DESCRIPTION OF THE INVENTION

Hereinafter, a lamp for a vehicle and a vehicle according to the present disclosure will be described with reference to the drawings.

Lamp for Vehicle

Figure 1:
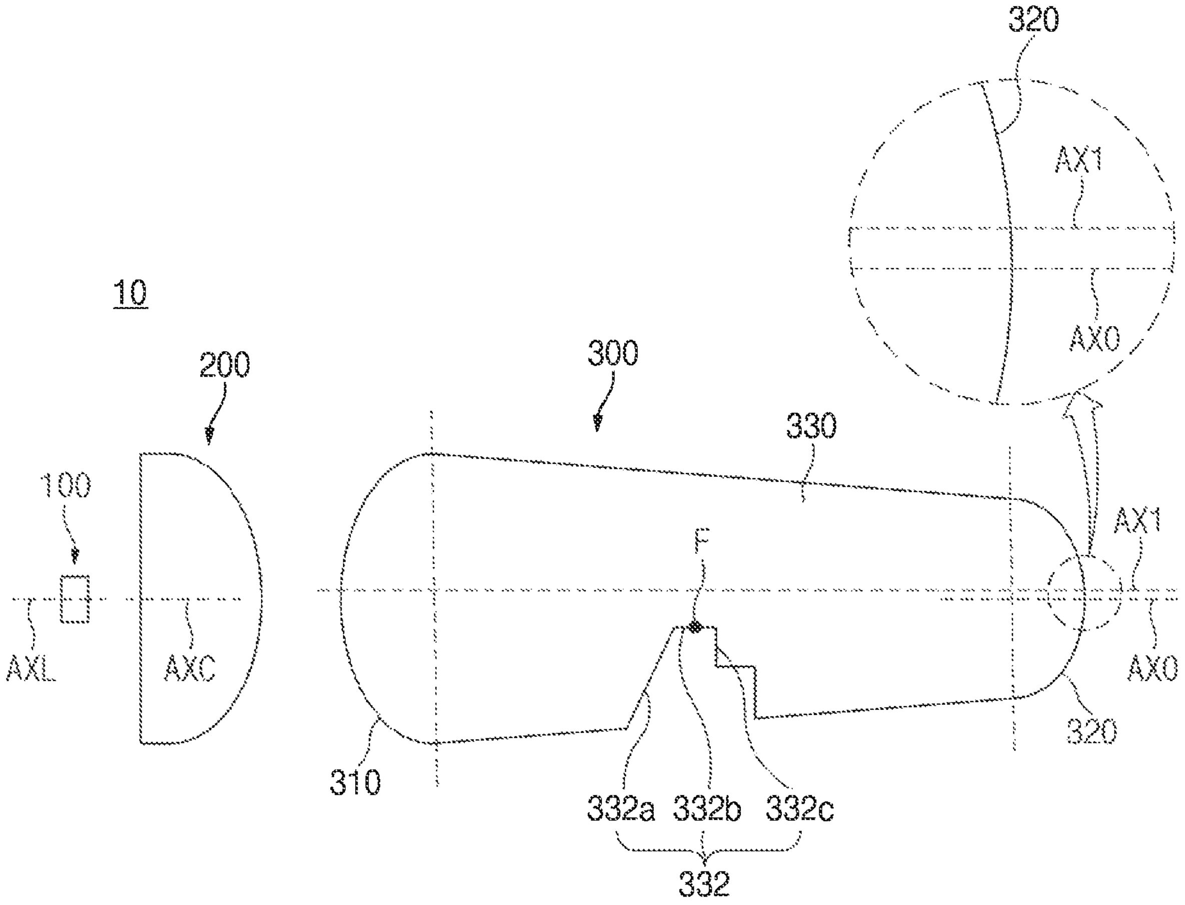
FIG. 1 is a vertical cross-sectional view schematically illustrating a structure of a lamp for a vehicle according to an embodiment of the present disclosure.
Figure 2:
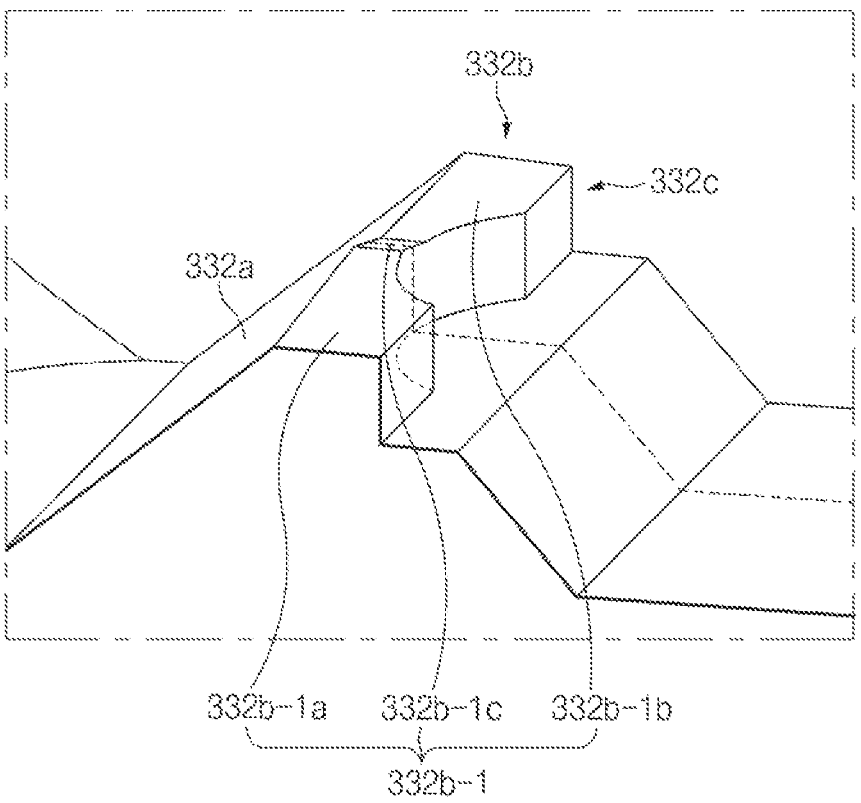
FIG. 2 is an enlarged perspective view illustrating a recessed region of a light guide part provided in the lamp for a vehicle according to the present disclosure.
Figure 3:
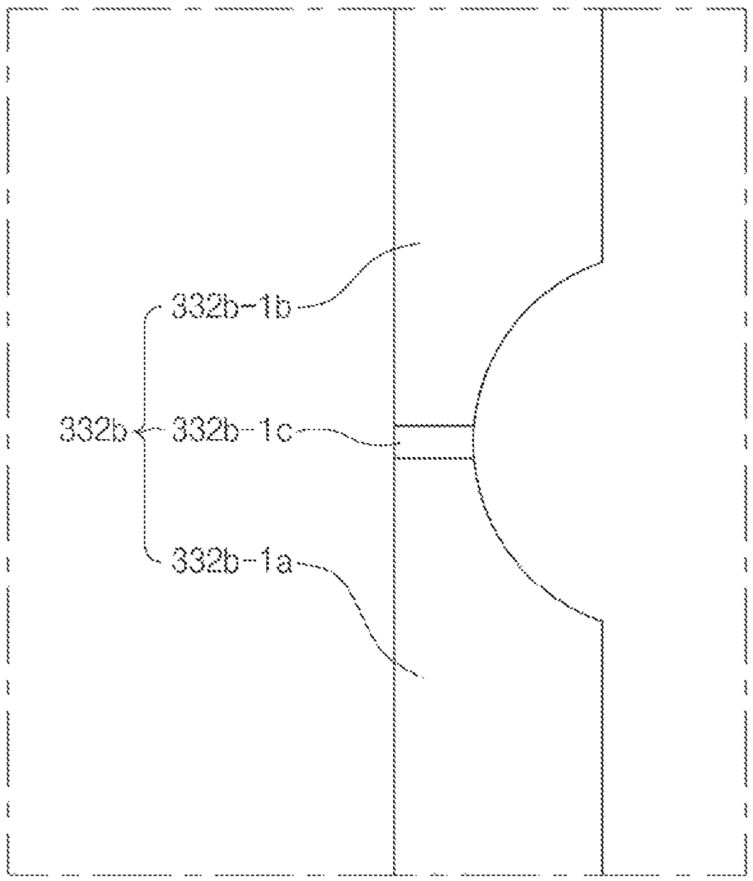
FIG. 3 is an enlarged top plan view illustrating the recessed region of the light guide part provided in the lamp for a vehicle according to the present disclosure.
Figure 4:
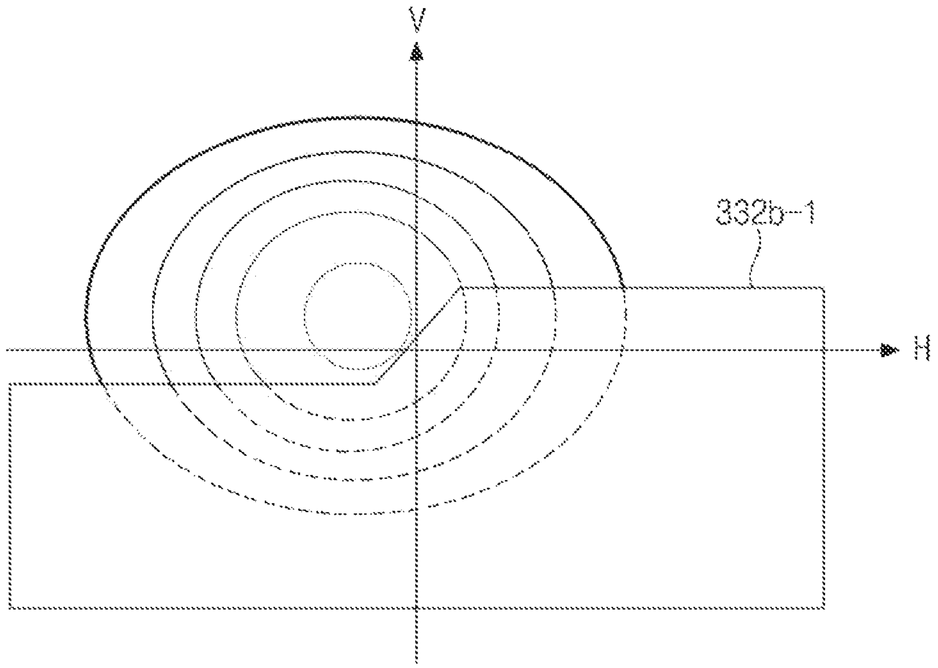
FIG. 4 is a view schematically illustrating light distribution of a beam pattern formed by the lamp for a vehicle according to the present disclosure.

FIG. 1 is a vertical cross-sectional view schematically illustrating a structure of a lamp for a vehicle according to an embodiment of the present disclosure, and FIG. 2 is an enlarged perspective view illustrating a recessed region of a light guide part positioned or provided in the lamp for a vehicle according to the present disclosure. FIG. 3 is an enlarged top plan view illustrating the recessed region of the light guide part provided in the lamp for a vehicle according to the present disclosure, and FIG. 4 is a view schematically illustrating light distribution of a beam pattern formed by the lamp for a vehicle according to the present disclosure.

A lamp 10 for a vehicle (hereinafter, referred to as a 'lamp') according to the present disclosure may be a low beam lamp for forming a low beam pattern.

In more detail, as illustrated in FIG. 1, the lamp 10 according to the present disclosure may include a light source 100 configured to emit light. The light source 100 may be an LED, but the type of light source 100 is not limited thereto.

The lamp 10 may include a collimator 200 positioned or disposed in front of the light source 100, and the light emitted from the light source 100 enters the collimator 200. The collimator 200 may be configured to convert the light, emitted from the light source 100, into parallel light and allow the parallel light to exit the collimator 200. The description of the optical principle in which the light entering the collimator 200 exits as the parallel light is replaced with the description of the related art.

Referring to FIG. 1, the lamp 10 according to the present disclosure may further include a light guide part 300 disposed in front of the collimator 200, and the light exiting from the collimator 200 enters the light guide part 300.

The light, which is emitted from the light source 100 and enters the light guide part 300 through the collimator 200, may propagate forward by being totally reflected in the light guide part 300 and then exit the light guide part 300. As described below, a part of the light having entered the light guide part 300 may propagate forward, whereas another part of the light is prevented from propagating forward. Therefore, the light exiting from the light guide part 300 may form a predetermined beam pattern. The beam pattern may be the low beam pattern as described above.

Referring to FIG. 1, the light guide part 300 may include: a light entering portion 310 provided at a rear side of the light guide part 300, disposed to face the collimator 200, and configured to allow the light exiting from the collimator 200 to enter the light entering portion 310; a light exiting portion 320 provided at a front side of the light guide part 300 and configured to allow the light exiting from the light entering portion 310 to enter the light exiting portion 320; and a body portion 330 configured to connect the light entering portion 310 and the light exiting portion 320.

The light guide part 300 according to the present disclosure may be an inner lens. In addition, more particularly, the light entering portion 310, the light exiting portion 320, and the body portion 330 may be formed integrally. The configuration in which the light entering portion 310, the light exiting portion 320, and the body portion 330 are formed integrally may mean that the light entering portion 310, the light exiting portion 320, and the body portion 330 are made of one material and thus coupled to one another indivisibly. In addition, the light guide part 300 may be made of plastic. In this case, the light guide part 300 made of plastic may be advantageous in ease of manufacturing because the light guide part 300 is easily formed. In particular, because the light guide part 300 according to the present disclosure, as described below, has an atypical shape in comparison with an inner lens in the related art, the light guide part 300 made of plastic may be considerably advantageous in ease of manufacturing.

Meanwhile, the light entering portion 310, the light exiting portion 320, and the body portion 330 may be distinguished depending on the shape of the light guide part 300. That is, referring to FIG. 1, the light entering portion 310 may have a shape protruding convexly rearward, the light exiting portion 320 may have a shape protruding convexly forward, and upper and lower surfaces of the body portion 330 may each have a planar shape. Therefore, a boundary between the light entering portion 310 and the body portion 330 may be defined at a point at which a curved surface of the light entering portion 310 meets a flat surface of the body portion 330. A boundary between the light exiting portion 320 and the body portion 330 may be defined at a point at which a curved surface of the light exiting portion 320 meets a flat surface of the body portion 330.

As described above, the lamp 10 according to the present disclosure may be a lamp for forming a low beam pattern. To this end, according to the present disclosure, the light guide part 300 may include a recessed region 332 formed in a lower surface of the light guide part 300 and having a shape recessed upward. Therefore, the light beams, which reach the recessed region 332 among the light beams entering the light guide part 300 after being emitted from the light source 100, may be reflected by the recessed region 332 and prevented from propagating forward. Therefore, a low beam pattern having a cut-off line may be formed. In more detail, the recessed region 332 may further include a cut-off portion having a shape corresponding to the cut-off line of the low beam pattern. The cut-off portion will be described below in detail.

The recessed region 332 may include a first section 332*a* is inclined upwardly. For example, the first section 332*a* may have a planar shape inclining upward and forward.

In this case, according to the present disclosure, a reflective layer for reflecting light may be formed on a surface of the first section 332*a*. Therefore, the light beams, which reach the first section 332*a* among the light beams entering the light guide part 300, may be reflected by the reflective layer and then propagate upward. Therefore, the beam pattern having a predetermined shape may be formed in front of the lamp 10. That is, the first section 332*a* may serve to prevent the light beams from propagating forward.

In addition, the recessed region 332 may further include a second section 332*b* extending forward from the first section 332*a* and having a predetermined angle with respect to a direction in which the first section 332*a* extends. For example, the second section 332*b* may extend in a horizontal direction.

In addition, the recessed region 332 may further include a third section 332*c* extending downward from the second section 332*b*. Meanwhile, the reflective layer may be formed only on the first section 332*a*. That is, according to the present disclosure, the reflective layer may be formed only in the entire region of the first section 332*a* of the recessed region 332.

Meanwhile, as illustrated in FIGS. 2 and 3, the second section 332*b* may include a cut-off portion 332*b*-1 having a stepped shape. The cut-off portion 332*b*-1 may be configured to form a low beam pattern having a cut-off line required by regulations related to the lamp for a vehicle. Therefore, the cut-off portion 332*b*-1 may have a shape corresponding to a shape of the cut-off line of the low beam pattern.

In more detail, as illustrated in FIGS. 2 and 3, the cut-off portion 332*b*-1 may include an upper surface 332*b*-1*a* provided at one side in a leftward/rightward direction, a lower surface 332*b*-1*b* provided at the other side in the leftward/rightward direction and disposed below the upper surface 332*b*-1*a*, and an inclined surface 332*b*-1*c* configured to connect the upper surface 332*b*-1*a* and the lower surface 332*b*-1*b* and extending inclinedly.

Meanwhile, according to the present disclosure, the light source 100, the collimator 200, the light entering portion 310, and the light exiting portion 320 may each have an optical axis. In the present specification and the drawings, the optical axis of the light source 100 is referred to as AXL, the optical axis of the collimator 200 is referred to as AXC, the optical axis of the light entering portion 310 is referred to as AXI, and the optical axis of the light exiting portion 320 is referred to as AXO.

The optical axis AXL of the light source 100 may be defined as an axis that penetrates a central point of a light-emitting surface of the light source 100 in a direction perpendicular to the light source 100.

Meanwhile, the collimator 200, the light entering portion 310, and the light exiting portion 320 may each be symmetric in the upward/downward direction and the leftward/rightward direction. The optical axis AXC of the collimator 200, the optical axis AXI of the light entering portion 310, and the optical axis AXO of the light exiting portion 320 may be respectively defined as axes along which the collimator 200, the light entering portion 310, and the light exiting portion 320 perpendicularly penetrate the central points in the upward/downward direction and the leftward/rightward direction. For example, the collimator 200 and the light exiting portion 320 may each have a rotationally symmetric structure. The light entering portion 310 may have an anamorphic lens shape having a shape symmetric in the upward/downward direction and the leftward/rightward direction. However, the shapes of the collimator 200, the light entering portion 310, and the light exiting portion 320 are not limited to the above-mentioned shapes.

Meanwhile, referring to FIG. 1, in the lamp 10 according to the embodiment of the present disclosure, the optical axis AXI of the light entering portion 310 and the optical axis AXO of the light exiting portion 320 may be substantially parallel to each other. The optical axis AXI of the light entering portion 310 may be positioned above the optical axis AXO of the light exiting portion 320.

Among the light beams emitted from the light source, the light beam in the central region has the highest luminous intensity, and the luminous intensity decreases from the central region to the peripheral region. FIG. 4 illustrates that the regions each having the same luminous intensity are respectively indicated by a plurality of contour lines.

In the case in which the optical axis AXI of the light entering portion 310 is positioned above the optical axis AXO of the light exiting portion 320 as described above, it is possible to minimize a degree to which the first section 332*a* and the cut-off portion 332*b*-1 prevent the light exiting along the optical axis AXI of the light entering portion 310 from propagating forward. In particular, according to the embodiment of the present disclosure, since the optical axis AXI of the light entering portion 310 is positioned above the optical axis AXO of the light exiting portion 320, it is possible to minimize the degree to which the first section 332*a* and the cut-off portion 332*b*-1 block the light existing in the region with high luminous intensity, thereby maximizing the luminous efficiency of the lamp. For example, the optical axis AXI of the light entering portion 310 may be positioned above the optical axis AXO of the light exiting portion 320 in a vertical direction.

Referring to FIG. 1, according to one aspect of the embodiment of the present disclosure, the optical axis AXL of the light source 100, the optical axis AXC of the collimator 200, and the optical axis AXO of the light exiting portion 320 may correspond to one another. In this case, the configuration in which the optical axes correspond to one another may include not only a case in which the optical axes are perfectly coincident with one another, but also a case in which the optical axes are positioned close to one another to the extent that there is no great difference in terms of performance of the lamp in comparison with the case in which the optical axes are coincident with one another. Since the optical axis AXL of the light source 100, the optical axis AXC of the collimator 200, and the optical axis AXO of the light exiting portion 320 correspond to one another as described above, the optical axis of the light entering portion 310 may not only be positioned above the optical axis AXO of the light exiting portion 320, but also be positioned above the optical axis AXL of the light source 100 and the optical axis AXC of the collimator 200.

Meanwhile, it is noted that the configuration in which one optical axis is positioned above another optical axis is premised on the assumption that the two optical axes are substantially parallel to each other in the upward/downward direction when viewed at least from the lateral side. This is because the concept in which one optical axis is positioned above another optical axis cannot be assumed when the optical axes intersect each other upward or downward when viewed from the lateral side without being parallel to each other.

In contrast, unlike the aforementioned configuration, according to another aspect of the embodiment of the present disclosure, the optical axis AXL of the light source 100 and the optical axis AXO of the light exiting portion 320 may be substantially parallel to each other, and the optical axis AXL of the light source 100 may be positioned above the optical axis AXO of the light exiting portion 320. In addition, according to another aspect of the embodiment of the present disclosure, the optical axis AXC of the collimator 200 and the optical axis AXO of the light exiting portion 320 may be substantially parallel to each other, and the optical axis AXC of the collimator 200 may be positioned above the optical axis AXO of the light exiting portion 320. More particularly, according to another aspect of the embodiment of the present disclosure, the optical axis AXL of the light source 100, the optical axis AXC of the collimator 200, and the optical axis AXI of the light entering portion 310 may correspond to one another.

Meanwhile, according to the present disclosure, the optical axis AXO of the light exiting portion 320 may be formed on a surface of the second section 332*b*, and a focal point F of the light exiting portion 320 may be formed on a surface of the second section 332*b*.

Figure 5:
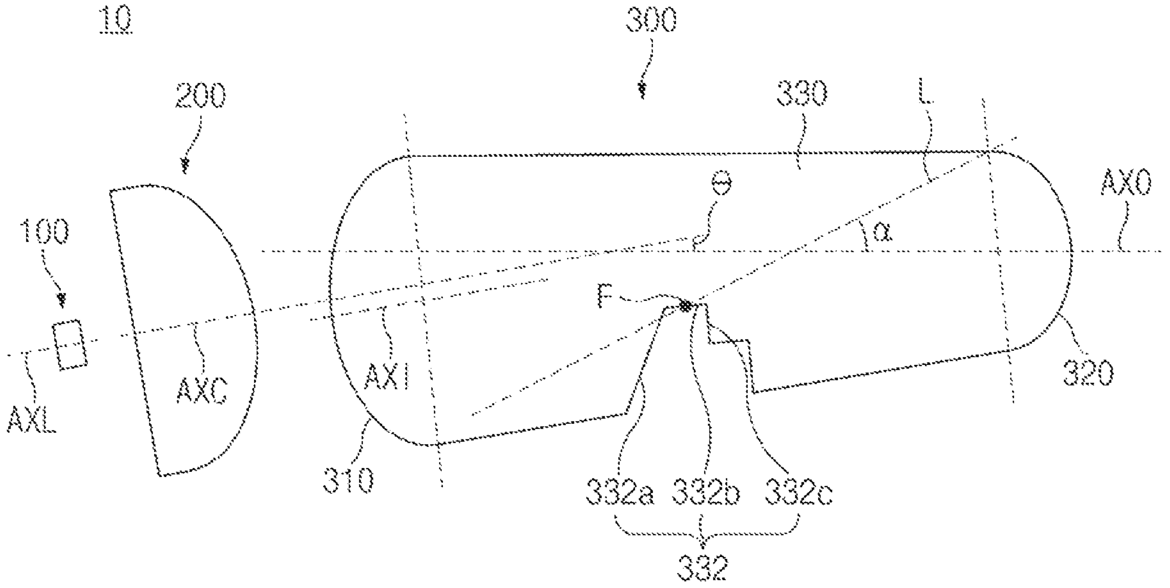
FIG. 5 is a vertical cross-sectional view schematically illustrating a structure of a lamp for a vehicle according to another embodiment of the present disclosure.

FIG. 5 is a vertical cross-sectional view schematically illustrating a structure of a lamp for a vehicle according to another embodiment of the present disclosure.

Like the above-mentioned embodiment of the present disclosure, the lamp 10 according to another embodiment of the present disclosure may include: the light source 100 configured to emit light; the collimator 200 disposed in front of the light source 100 and configured to allow the light exiting from the light source 100 to enter the collimator 200; and the light guide part 300 disposed in front of the collimator 200 and configured to allow the light exiting from the collimator 200 to enter the light guide part 300. The light guide part 300 may include: the light entering portion 310 provided at the rear side of the light guide part 300, disposed to face the collimator 200, and configured to allow the light exiting from the collimator 200 to enter the light entering portion 310; the light exiting portion 320 provided at the front side of the light guide part 300 and configured to allow the light exiting from the light entering portion 310 to enter the light exiting portion 320; and the body portion 330 configured to connect the light entering portion 310 and the light exiting portion 320. In addition, the light entering portion 310, the light exiting portion 320, and the body portion 330 may be formed integrally.

However, unlike the above-mentioned embodiment of the present disclosure, according to the lamp 10 according to another embodiment of the present disclosure, the optical axis AXC of the collimator 200 and the optical axis AXO of the light exiting portion 320 may have a predetermined angle without being parallel to each other. For example, the optical axis AXO of the light exiting portion 320 may extend in the horizontal direction, and the optical axis AXC of the collimator 200 may be inclined upwardly with respect to the optical axis AXO of the light exiting portion 320. Therefore, according to another embodiment of the present disclosure, the optical axis AXO of the light exiting portion 320 and the optical axis AXC of the collimator 200 may have a predetermined angle in the upward/downward direction. In the present specification, an angle defined between the optical axis AXC of the collimator 200 and the optical axis AXO of the light exiting portion 320 in the upward/downward direction is referred to as θ. An angle defined in the upward/downward direction between the optical axis AXO of the light exiting portion 320 and a line L connecting a focal point F of the light exiting portion 320 and an upper end of the light exiting portion 320 is referred to as α.

In this case, according to the embodiment of the present disclosure, the angle θ defined between the optical axis AXC of the collimator 200 and the optical axis AXO of the light exiting portion 320 may be equal to or smaller than the angle α defined between the optical axis AXO of the light exiting portion 320 and the line L connecting the focal point F of the light exiting portion 320 and the upper end of the light exiting portion 320. This is to prevent a loss of light that occurs when the light entering the light entering portion 310 propagates upward through an upper surface of the body portion 330 before reaching the light exiting portion 320.

Referring to FIG. 5, according to another embodiment of the present disclosure, like the optical axis AXC of the collimator 200, the optical axis AXI of the light entering portion 310 may also be inclined upwardly. Therefore, the optical axis AXI of the light entering portion 310 and the optical axis AXO of the light exiting portion 320 may also have a predetermined angle.

In this case, according to another embodiment of the present disclosure, the optical axis AXC of the collimator 200 and the optical axis AXI of the light entering portion 310 may be substantially parallel to each other and correspond to each other. This is to maximize luminous efficiency of the lamp by maximizing a degree to which the light exiting from the collimator 200 enters the light entering portion 310.

Figure 6:
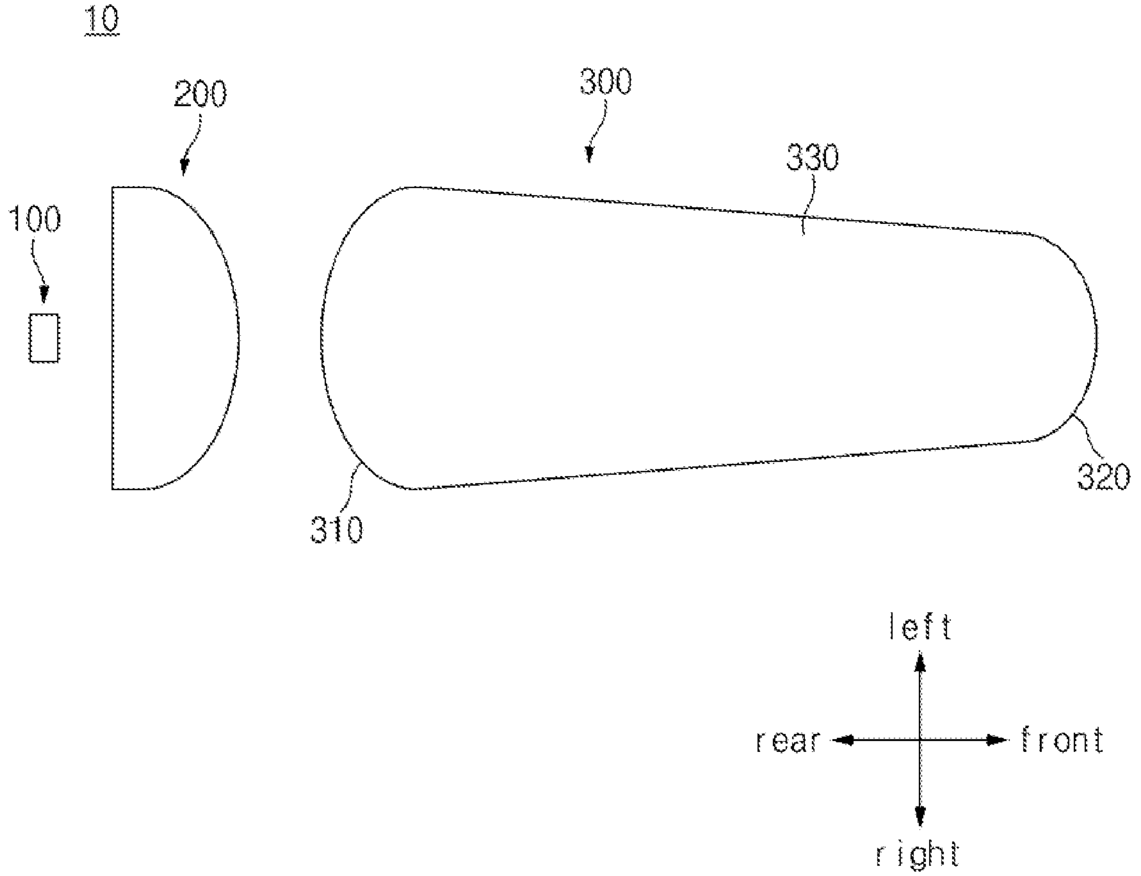
FIG. 6 is a top view schematically illustrating a structure of a lamp for a vehicle according to another embodiment of the present disclosure.

Meanwhile, as illustrated in FIGS. 1 and 5, according to the present disclosure, a size of the light entering portion 310 may be larger than a size of the light exiting portion 320. In more detail, a height of the light entering portion 310 in the upward/downward direction may be greater than a height of the light exiting portion 320 in the upward/downward direction. Furthermore, as shown in FIG. 6, a width of the light entering portion 310 in the leftward/rightward direction may be greater than a width of the light exiting portion 320 in the leftward/rightward direction. This is to maximize light concentration efficiency when the light entering the light entering portion 310 propagates to the outside through the light exiting portion 320.

Vehicle

The vehicle according to the present disclosure may include the lamp 10 for a vehicle. In this case, the lamp 10 may be a lamp for forming a low beam pattern.

The lamp 10 may include the light source 100 configured to emit light, the collimator 200 disposed in front of the light source 100 and configured to allow the light exiting the light source 100 to enter the collimator 200, and the light guide part 300 disposed in front of the collimator 200 and configured to allow the light exiting from the collimator 200 to enter the light guide part 300. In addition, the light guide part 300 may include: the light entering portion 310 provided at the rear side of the light guide part 300, disposed to face the collimator 200, and configured to allow the light exiting from the collimator 200 to enter the light entering portion 310; the light exiting portion 320 provided at the front side of the light guide part 300 and configured to allow the light exiting from the light entering portion 310 to enter the light exiting portion 320; and the body portion 330 configured to connect the light entering portion 310 and the light exiting portion 320. In this case, the light entering portion 310, the light exiting portion 320, and the body portion 330 may be formed integrally.

In this case, the optical axis AXI of the light entering portion 310 and the optical axis AXO of the light exiting portion 320 may be substantially parallel to each other, and the optical axis AXI of the light entering portion 310 may be positioned above the optical axis AXO of the light exiting portion 320.

Meanwhile, the above-mentioned description of the lamp for a vehicle according to the present disclosure may also be equally applied to the vehicle according to the present disclosure.

The present disclosure has been described with reference to the limited embodiments and the drawings, but the present disclosure is not limited thereto. The present disclosure may be carried out in various forms by those skilled in the art to which the present disclosure pertains within the technical spirit of the present disclosure and within the scope equivalent to the appended claims.

What is claimed is:

1. A lamp for a vehicle, comprising:

a light source configured to emit light; and a light guide part positioned in front of the light source, wherein the light emitted from the light source enters the light guide part, wherein the light guide part comprises:

a light entering portion positioned at a rear portion of the light guide part and having a first surface having a symmetrical shape in an upward/downward direction and a leftward/rightward direction and facing the light source, wherein the light emitted from the light source enters the light guide part via the first surface of the light entering portion;

a light exiting portion positioned at a front portion of the light guide part and having a second surface having a symmetrical shape in the upward/downward direction and the leftward/rightward direction and facing away from the light source, wherein the light that enters the light guide part via the first surface of the light entering portion enters exits from the light guide part via the second surface of the light exiting portion; and a body portion positioned between the light entering portion and the light exiting portion, wherein the light entering portion, the light exiting portion, and the body portion are integrally formed, wherein the light that enters the light entering portion propagates through a first optical axis of the light entering portion extending through a symmetrical center point of the first surface of the light entering portion, wherein the light that exits from the light exiting portion propagates through a second optical axis of the light exiting portion extending through a symmetrical center point of the second surface of the light exiting portion, wherein the first optical axis of the light entering portion extends above the second optical axis of the light exiting portion in at least a portion of the light guide part, and wherein the body portion comprises a light blocking region positioned at a lower surface of the light guide part and the first optical axis of the light entering portion is positioned above the light blocking region.

2. The lamp of claim 1, wherein the first optical axis of the light entering portion is substantially parallel to the second optical axis of the light exiting portion.

3. The lamp of claim 2, wherein the first optical axis vertically overlaps the second optical axis.

4. The lamp of claim 1, wherein the light blocking region comprises a first section that is inclined upwardly and has a surface at which a reflective layer is positioned.

5. The lamp of claim 4, wherein the light blocking region further comprises a second section extending forward from the first section in a direction forming a predetermined angle with respect to a direction in which the first section extends.

6. The lamp of claim 5, wherein the light blocking region further comprises a third section extending downwardly from the second section.

7. The lamp of claim 1, wherein a third optical axis of the light source is coaxial with the second optical axis of the light exiting portion.

8. The lamp of claim 1, wherein a third optical axis of the light source is substantially parallel to and positioned above the second optical axis of the light exiting portion.

9. The lamp of claim 1, wherein a third optical axis of the light source is coaxial with the first optical axis of the light entering portion.

10. The lamp of claim 5, wherein the second optical axis of the light exiting portion is positioned on a surface of the second section.

11. The lamp of claim 5, wherein:

the second section comprises a cut-off portion having a stepped shape, and the cut-off portion comprises:

an upper surface positioned at a first side portion of the second section;

a lower surface positioned at a second side portion of the second section and positioned below the upper surface; and an inclined surface between the upper surface and the lower surface.

12. The lamp of claim 1, wherein the light entering portion has a height greater than that of the light exiting portion.

13. The lamp of claim 12, wherein the light entering portion has a width greater than that of the light exiting portion.

14. A lamp for a vehicle, comprising:

a light source configured to emit light; and a light guide part positioned in front of the light source, wherein the light emitted from the light source enters the light guide part, wherein the light guide part comprises:

a light entering portion positioned at a rear portion of the light guide part and having a first surface having a symmetrical shape in an upward/downward direction and a leftward/rightward direction and facing the light source, wherein the light emitted from the light source enters the light guide part via the first surface of the light entering portion;

a light exiting portion positioned at a front portion of the light guide part and having a second surface having a symmetrical shape in the upward/downward direction and the leftward/rightward direction and facing away from the light source, wherein the light that enters the light guide part via the first surface of the light entering portion exits from the light guide part via the second surface of the light exiting portion; and a body portion positioned between the light entering portion and the light exiting portion, wherein the light entering portion has a first optical axis extending through the light exiting portion, wherein the light entering portion, the light exiting portion, and the body portion are integrally formed, wherein the light entering the light entering portion propagates through a first optical axis of the light entering portion extending through a symmetrical center point of the first surface of the light entering portion, wherein the light exiting from the light exiting portion propagates through a second optical axis of the light exiting portion extending through a symmetrical center point of the second surface of the light exiting portion, the first optical axis extending above the second optical axis in at least a portion of the light guide part, and wherein the light entering portion has a width greater than that of the light exiting portion, wherein the body portion comprises a light blocking region positioned at a lower surface of the light guide part and the first optical axis of the light entering portion is positioned above the light blocking region.

15. The lamp of claim 14, wherein the first optical axis of the light entering portion is inclined upwardly with respect to a second optical axis of the light exiting portion.

16. The lamp of claim 15, wherein a first angle between the first optical axis of the light entering portion and the second optical axis of the light exiting portion is equal to or smaller than a second angle between the second optical axis of the light exiting portion and a line connecting a focal point of the light exiting portion and an upper end of the light exiting portion.

17. The lamp of claim 15, wherein the first optical axis of the light entering portion is inclined upwardly.

18. A vehicle comprising a lamp for a vehicle, wherein the lamp comprises:

a light source configured to emit light; and a light guide part positioned in front of the light source, wherein the light emitted from the light source enters the light guide part, wherein the light guide part comprises:

a light entering portion positioned at a rear portion of the light guide part and having a first surface having a symmetrical shape in an upward/downward direction and a leftward/rightward direction and facing the light source, wherein the light emitted from the light source enters the light guide part via the first surface of the light entering portion;

a light exiting portion positioned at a front portion of the light guide part and having a second surface having a symmetrical shape in the upward/downward direction and the leftward/rightward direction and facing away from the light source, wherein the light that enters the light guide part via the first surface of the light entering portion exits from the light guide part via the second surface of the light exiting portion; and a body portion positioned between the light entering portion and the light exiting portion, wherein the light entering portion, the light exiting portion, and the body portion are integrally formed, wherein the light entering the light entering portion propagates through a first optical axis of the light entering portion extending through a symmetrical center point of the first surface of the light entering portion, wherein the light exiting from the light exiting portion propagates through a second optical axis of the light exiting portion extending through a symmetrical center point of the second surface of the light exiting portion, and wherein the first optical axis of the light entering portion is positioned above the second optical axis of the light exiting portion in at least a portion of the light guide part, wherein the body portion comprises a light blocking region positioned at a lower surface of the light guide part and the first optical axis of the light entering portion is positioned above the light blocking region.

* * * * *